US010569969B2

(12) United States Patent
Garthaffner et al.

(10) Patent No.: US 10,569,969 B2
(45) Date of Patent: Feb. 25, 2020

(54) BEAD FEEDER

(71) Applicant: Philip Morris USA Inc., Richmond, VA (US)

(72) Inventors: Martin T. Garthaffner, Chesterfield, VA (US); Dwight D. Williams, Powatan, VA (US)

(73) Assignee: Philip Morris USA Inc., Richmond, VA (US)

(*) Notice: Subject to any disclaimer, the term of this patent is extended or adjusted under 35 U.S.C. 154(b) by 609 days.

(21) Appl. No.: 13/777,749

(22) Filed: Feb. 26, 2013

(65) Prior Publication Data
US 2014/0239006 A1  Aug. 28, 2014

(51) Int. Cl.
B65G 47/14  (2006.01)

(52) U.S. Cl.
CPC ................. B65G 47/1428 (2013.01)

(58) Field of Classification Search
CPC .............. A24D 3/0216; B65G 47/1407; B65G 47/848; B65G 47/1428
USPC ........................................ 493/47; 221/1, 265
See application file for complete search history.

(56) References Cited

U.S. PATENT DOCUMENTS

| 611,302 | A | 9/1898 | Weiss |
| 3,064,406 | A | 11/1962 | Kennedy et al. |
| 3,817,423 | A | 6/1974 | McKnight |
| 3,986,636 | A | 10/1976 | Hoppmann et al. |
| 4,144,970 | A | 3/1979 | McKnight et al. |
| 5,826,696 | A | 10/1998 | Rupp et al. |
| 5,865,342 | A | 2/1999 | Ito et al. |
| 7,510,099 | B2 | 3/2009 | Knoth et al. |
| 8,381,947 | B2* | 2/2013 | Garthaffner .......... A24D 3/0216 221/68 |
| 9,004,261 | B2* | 4/2015 | CieŚLikowski et al. .................... A24D 3/0216 198/479.1 |
| 9,049,887 | B2* | 6/2015 | Ercelebi ............... A24D 3/0216 |
| 9,089,163 | B2* | 7/2015 | Le Roux .................. A24D 3/02 |
| 2004/0020554 | A1* | 2/2004 | Smith .................. A24D 3/0225 141/67 |

(Continued)

Primary Examiner — Robert F Long
Assistant Examiner — Xavier A Madison
(74) Attorney, Agent, or Firm — Harness, Dickey & Pierce, P.L.C.

(57) ABSTRACT

A bead feeder serially delivering beads to a downstream location comprises a bead supply wheel connected to rotate about a vertical axis. The bead supply wheel includes a bead supply bowl and a plurality of radially and outwardly extending bead passageway connected to rotate with the bowl and dimensioned to receive a single line of beads. A plurality of openings in the bead supply bowl is spaced around a lower portion thereof with the openings in alignment with the radially and outwardly extending passageways each of which has an outer exit end. A metering plate is connected to rotate about the same vertical axis as the bead supply wheel, and metering plate has a plurality of equally spaced apart openings directly below the outer ends of the passageways for receiving the lowermost beads in the passageways. The metering plate rotates at a slightly slower or slightly faster speed than the bead supply wheel so that vertical alignment of an outer exit end of a particular passageway and an opening in the metering plate only occurs once for each revolution of the bead supply wheel. A drop off is provided for the removal of beads away from the metering plate.

18 Claims, 2 Drawing Sheets

(56) References Cited

U.S. PATENT DOCUMENTS

| | | |
|---|---|---|
| 2004/0050311 A1 | 3/2004 | Mariman et al. |
| 2005/0070409 A1 | 3/2005 | Deal |
| 2009/0145724 A1* | 6/2009 | Garthaffner .......... A24D 3/0216 198/478.1 |
| 2009/0166376 A1* | 7/2009 | Garthaffner .......... A24D 3/0216 221/282 |
| 2011/0053745 A1* | 3/2011 | Iliev .................... A24D 3/0216 493/47 |

* cited by examiner

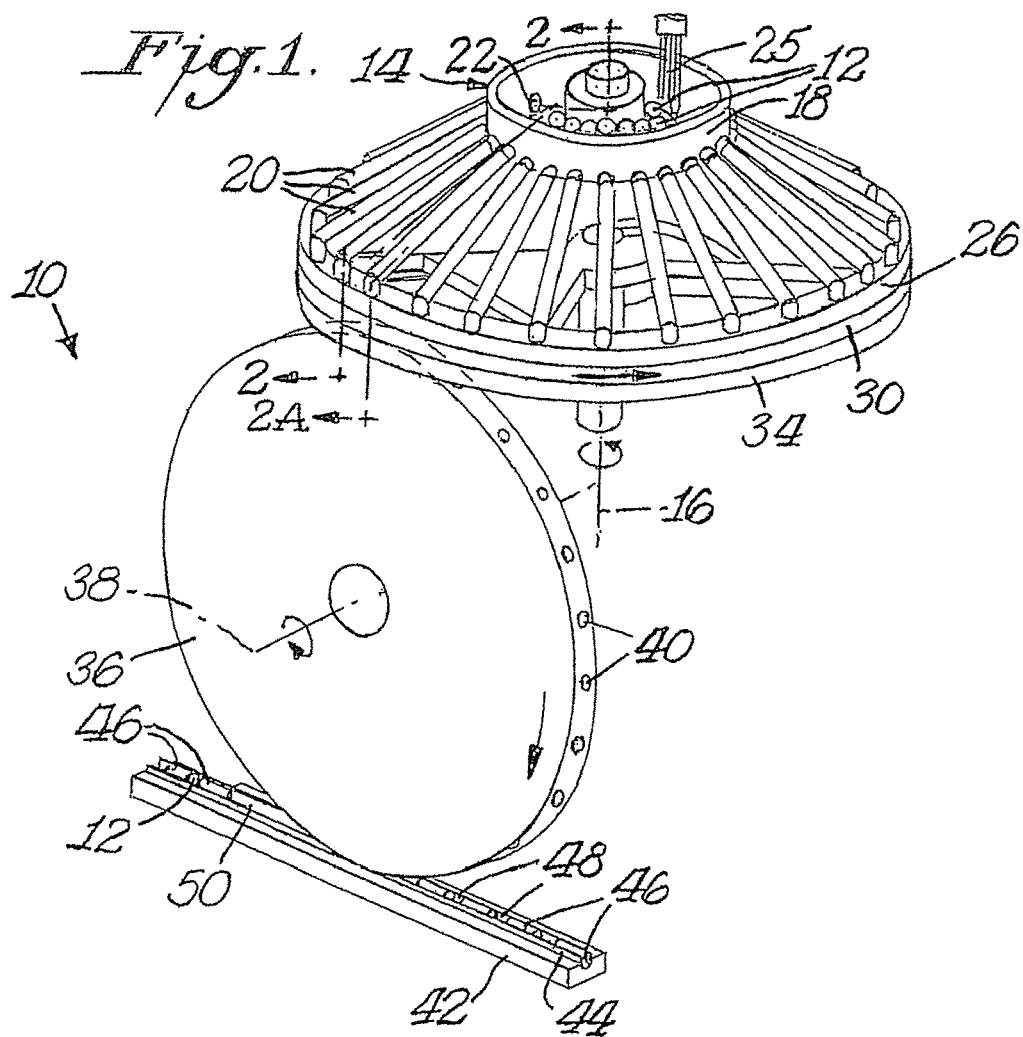
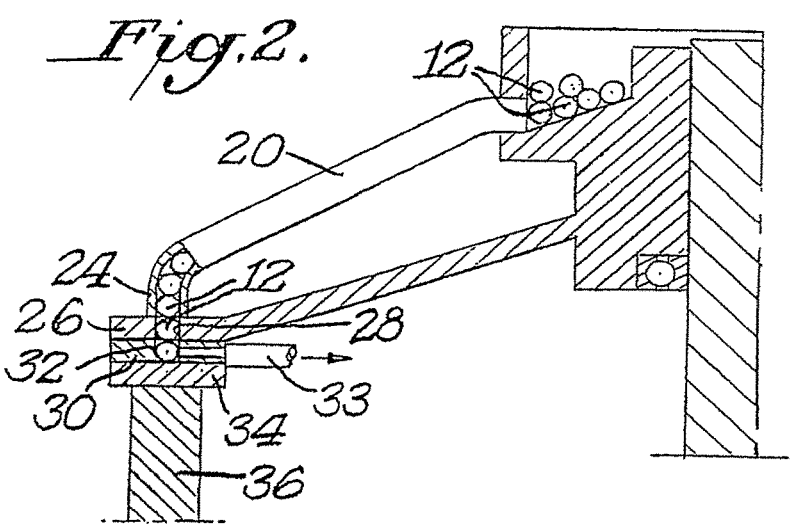

BEAD FEEDER

FIELD

The present disclosure relates to bead feeder, and more particularly to a machine the feeds generally spherical beads from a bulk supply to a downstream location such as the interior space of a plug-space-plug cigarette filter during filter production.

BACKGROUND

A variety of cigarette filters have been proposed over the years, and many of these filters include granular filter materials particularly in so-called plug-space-plug filter arrangements. In these filter arrangements spaced apart plugs, usually made of cellulose acetate, define a cavity or space therebetween which is filled with granulated material, such as granulated carbon as well as other materials. For example, beaded material has also been proposed for introduction into the space of a plug-space-plug filter arrangement. The actual filing of the space may be in a horizontal manner and in other instances the filling operation is vertically oriented. Also, as an alternative to a charge of granules or beads, larger beads may be fed to the space between the cellulose acetate plugs, with one bead introduced into each space or cavity.

SUMMARY

In one form, disclosed herein is a bead feeder that functions to serially delivery beads from a bulk supply to a downstream location in a highly efficient manner.

In another form, disclosed herein is a bead feeder that transports beads from a bulk supply to a space or cavity in a cigarette filter during filter production.

In yet another form, disclosed herein is a bead feeder which operates at a high speed in a simple and trouble free manner.

In one aspect, a bead feeder is provided that includes a bead supply wheel connected to rotate about a substantially vertical axis. The bead supply wheel includes a bead supply bowl that delivers beads to a plurality of radially arranged and outwardly extending transfer passageways connected to rotate with the bowl. The bowl includes a plurality of discharge openings spaced around a lower portion thereof, and each opening is in alignment with one of radially and outwardly extending passageways. The passageways guide the beads one after another in a line in a downstream direction.

The bead feeder further includes a feed plate positioned directly below the outer exit ends of the passageways for receiving a lowermost bead from the single line of beads in each passageway. The feed plate includes a plurality of pockets or openings for receiving the beads, and the feed plate is connected to rotate with the bead supply wheel at the same rotational speed.

A metering plate is positioned directly below the feed plate, and the metering plate rotates about the same vertical axis as the bead supply wheel and the feed plate. Openings in the metering plate receive beads from the pockets or openings of the feed plate. The metering plate rotates slightly slower or slightly faster than the feed plate so that alignment and transfer of beads into the openings of the metering wheel only occurs once for each opening and each revolution of the feed plate. Discharge of a bead from its respective opening in the metering plate occurs at a transfer point, along the path of travel of the metering plate.

A bead transfer wheel may be provided to receive the beads from the metering plate. The transfer wheel rotates on a horizontal axis, and spaced apart pockets on the outer circumference of the wheel receive the beads from the metering plate as they fall away at the transfer point of the metering wheel. Vacuum may be used to draw and hold the beads in the pockets of the transfer wheel until the beads are released from the wheel.

In another aspect, a moving garniture is in alignment with and directly below the bead transfer wheel. The garniture transports filter paper with equally spaced apart plugs on the paper, and the downstream location to which the beads are delivered comprises the spaces or cavities between the plugs. The bead transfer wheel functions to deliver a single bead to each such cavity. A stationary stripper adjacent the bead transfer wheel functions to assist in removal of the beads from the wheel.

BRIEF DESCRIPTION OF THE DRAWINGS

Novel features and advantages of the present invention in addition to those mentioned above will be readily apparent to persons of ordinary skill in the art from a reading of the following detailed description in conjunction with the accompanying drawings wherein similar reference characters refer to similar parts and in which:

FIG. 1 is a perspective view of a bead feeder, in accordance with the present invention.

FIG. 2 is a sectional view taken along line 2-2 of FIG. 1; and

DETAILED DESCRIPTION

Figure 2A:
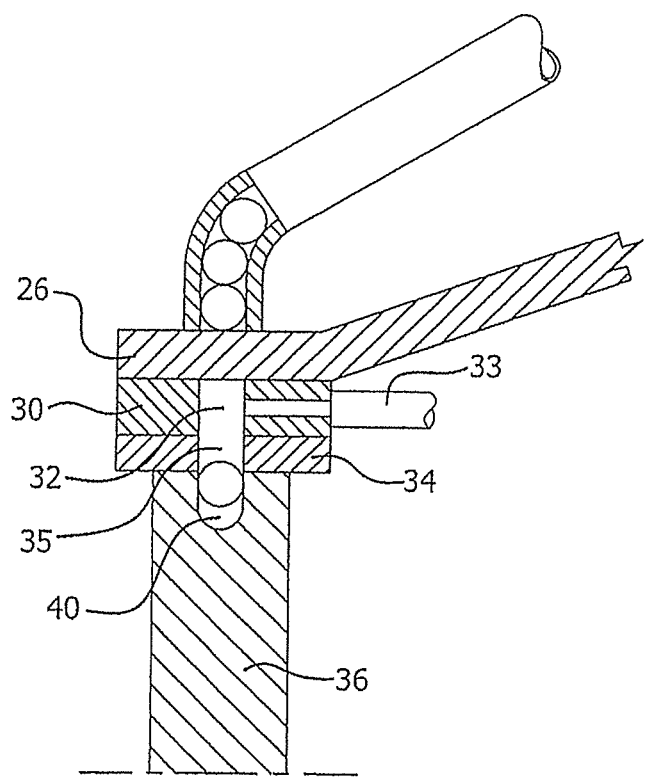
FIG. 2A is a sectional view taken along line 2A-2A of FIG. 1.

Referring in more particularity to the drawings, FIGS. 1, 2 and 2A illustrate a bead feeder 10 for serially delivering beads 12 to a downstream location. As explained more fully below such downstream location may be the space or cavity between spaced apart cellulose acetate plugs in the production of so-called plug-space-plug cigarette filters. Throughout the detailed description the term bead is utilized which is intended to include spherical configurations as well as spherically ended components.

The bead feeder 10 of the present invention comprises a bead supply wheel 14 connected to rotate about a substantially vertical axis 16. The bead supply wheel includes a bead supply bowl 18 and a plurality of radially and outwardly extended tubes or bead passageways 20 connected to rotate with the bowl 18 and dimensioned to receive a single line of beads from the bowl. A plurality of discharge openings 22 in the bead supply bowl 18 are spaced around the lower portion of the bowl with the openings 22 in alignment with the radially and outwardly passageways 20. Each of the passageways 20 has an outer exit end 24. A stationary brush 25 may be positioned within the bowl 18 to mix the beads 12.

A feed plate 26 is positioned directly below the outer exit ends 24 of the passageways 20 for receiving a lowermost bead 12 from the single line of beads in each passageway. The lowermost bead 12 in each passageway is received within pockets 28 in the feed plate, and the plate is connected to rotate with the bead supply wheel 14 at the same rotational speed.

A metering plate 30 is positioned directly below the feed plate 26, and the metering plate also rotates about the vertical axis 16. The metering plate 30 includes a plurality of openings 32 equally spaced apart in a circle directly below the pockets of the feed plate with an equal number of pockets 28 and openings 32. However, the metering plate 30 is connected to rotate at a slightly slower or slightly faster speed than the feed plate 26 so that vertical alignment of a pocket 28 with an opening 32 only occurs once during each revolution of the feed plate. That point of alignment is shown in FIG. 2 where the lowermost bead 12 in one pocket of the feed plate drops into an aligned opening 32 of the metering plate. The point of vertical alignment between a pocket 28 and opening 32 occurs about 10° to 30° before the bead is removed from the metering plate.

Each opening 32 of the metering plate is sized to receive a single bead, and vacuum 33 may be supplied to the opening to assist in the transfer from the feed plate. Otherwise the beads in the pockets of the feed plate engage the surface of the metering plate 30 between successive openings until the next alignment of the pocket 28 with an opening 32 after approximately one full rotation of the feed plate. As explained above, such alignment may occur slightly before a transfer of beads away from the metering plate 30, about 10° to 30° before the transfer point.

A stationary dead plate 34 is positioned directly below metering plate 30 and the beads already in the openings 32 of the metering plate roll along or otherwise engage the dead plate as the metering plate rotates about the vertical axis 16. The dead plate includes a drop-off 35 having dimensions sufficient to allow beads 12 to pass through the drop-off 35 in dead plate 34 at the transfer point of beads away from the metering plate through which the beads in the openings 32 drop for subsequent delivery of the beads to a downstream location. This position is shown in FIG. 2A.

In some embodiments, optional vacuum 33 is applied to the openings 32 to assist in the transfer of the beads from the feed plate 26 and to hold the beads within the openings 32. If optional vacuum 33 is applied, the vacuum is vented to atmosphere above the drop-off. In some embodiments, vacuum 33 may be eliminated since, as with the configuration shown in FIG. 2A, beads 12 drop into exterior pockets 40 on transfer wheel 36 through a single point drop-off 35 in dead plate 34 and may do so effectively without the application of vacuum 33.

The bead feeder 10 also includes a bead transfer wheel 36 below the dead plate 34 connected to rotate about a substantially horizontal axis 38. The transfer wheel 36 includes equally spaced apart exterior pockets 40 on the circumferences of the wheel for receiving beads 12 from the metering plate 30 as they fall through the drop-off in the dead plate 34. The outer surface of the transfer wheel is at the same elevation as the bottom surface of the dead plate.

Vacuum may be connected to selected pockets 40 to effect deposit of the beads into the pockets and ultimate removal from the bead transfer wheel.

In one application of the present invention a moving garniture 42 of a machine for producing cigarette filters is in alignment with and directly below the bead transfer wheel 36. The garniture 42 functions to transport filter paper 44 with equally spaced apart plugs 46 on the paper. Alternatively, the plugs 46 could be unevenly spaced apart, and in that case the delivery wheel pitch would be designed to synchronize with the cavities between the plugs. The plugs 44 may be made of cellulose acetate with appropriate binder, but other plug materials are equally acceptable depending upon the desired cigarette filter construction. The downstream location to which the beads 12 are delivered by the bead transfer wheel 36 of the bead feeder 10 comprise cavities or spaces 48 between the plugs 46. Ultimately after a bead is inserted into a cavity 48, the garniture functions to close the filter paper around the plugs and the beads, and after sealing the paper with adhesive along the longitudinal edges thereof the continuous filter composite is cut into individual plug-space-plug filters which are subsequently joined to wrapped tobacco rods.

A stationary stripper 50 may be positioned as shown in FIG. 1 adjacent the bead transfer wheel 36. The stripper is constructed and arranged to remove beads 12 from the pockets 40 of the bead transfer wheel 36. Additionally, the stripper may function to interrupt the vacuum supply to the pockets 40 to assist in removal of the beads from the pockets and discharge thereof into the cavities 48. A single bead is delivered to each of the cavities.

Any suitable drive mechanism may be utilized to rotate the bead supply wheel 13 and the bead transfer wheel 36. Also, the drive mechanism functions to rotate the metering plate at a slightly faster or slower speed than the bead supply wheel 14, for the reasons discussed above.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. A bead feeder for serially delivering beads to a downstream location comprising:
   a bead supply wheel configured to rotate about a substantially vertical axis, the bead supply wheel including,
      a bead supply bowl including,
         a plurality of discharge openings in the bead supply bowl, the openings spaced around a lower portion thereof, and
      a plurality of radially and outwardly extending bead passageways configured to rotate with the bowl and dimensioned to receive a single line of beads from the bowl, the openings in the bead supply bowl in alignment with the radially and outwardly extending passageways, each of the passageways having an outer exit end;
   a metering plate configured to rotate about the substantially vertical axis, the metering plate having a plurality of equally spaced apart openings configured to align directly below the outer exit ends of the passageways, the plurality of equally spaced apart openings configured to receive the lowermost beads in the passageways;

the metering plate configured to rotate at a slower or faster speed than the bead supply wheel such that vertical alignment of one opening of the plurality of equally spaced apart openings with one exit of the outer exit ends of the passageways occurs only once during each revolution of the bead supply wheel;

a bead transfer wheel below the metering plate, the bead transfer wheel configured to rotate about a substantially horizontal axis, the transfer wheel having spaced apart exterior pockets on circumferential portions thereof for receiving the beads; and a stationary dead plate having a single cylindrical aperture therethrough and a consistent thickness throughout, the cylindrical aperture being a single transfer point for beads away from the metering plate when the one opening of the plurality of equally spaced apart openings in the metering plate aligns with the cylindrical aperture in the dead plate to transfer a bead of the beads from the one opening directly to the cylindrical aperture, the dead plate being interposed between the metering plate and the bead transfer wheel at the transfer point, and the cylindrical aperture having a radius sufficient to allow beads to pass through the aperture and into one of the exterior pockets of the bead transfer wheel when the one of the exterior pockets of the bead transfer wheel aligns with the cylindrical aperture, but having dimensions not sufficient to accommodate a width of the bead transfer wheel such that the stationary dead plate remains disposed between the metering plate and the bead transfer wheel.

2. The bead feeder of claim 1, further comprising:

a moving garniture in alignment with and directly below the transfer wheel, wherein the garniture is configured to transport filter paper with equally spaced apart plugs on the paper; and the downstream locations to which the beads are delivered comprise cavities between the plugs.

3. The bead feeder of claim 2, wherein the transfer wheel is constructed and configured to deliver a single bead to each cavity.

4. The bead feeder of claim 1, further comprising:

a stationary stripper adjacent the bead transfer wheel, the stationary stripper configured to remove beads from the bead transfer wheel at the downstream location.

5. The bead feeder of claim 1, wherein the aperture has dimensions sufficient to allow beads to pass through the aperture in the absence of applied vacuum.

6. The bead feeder of claim 1, wherein the transfer point for beads away from the metering plate is at a location different from a location of vertical alignment of the one opening of the plurality of equally spaced apart openings in the metering plate with the one exit of the outer exit ends of the passageways.

7. The bead feeder of claim 6, wherein the location of vertical alignment is before the transfer point.

8. The bead feeder of claim 7, wherein the location of vertical alignment is within a range of 10° to 30° before the transfer point.

9. The bead feeder of claim 1, wherein a single bead is retained in the aperture of the stationary dead plate from a location of the transfer point for beads away from the metering plate to a location of vertical alignment of one pocket of the spaced apart exterior pockets in the bead transfer wheel with the aperture.

10. The bead feeder of claim 1, further comprising:

a feed plate disposed between the metering plate and the plurality of radially and outwardly extending bead passageways and configured to rotate with the bead supply wheel about the substantially vertical axis, wherein the feed plate includes a plurality of pockets, with each of the plurality of pockets aligning with a respective passageway of the plurality of radially and outwardly extending bead passageways, each of the plurality of pockets configured to receive a lowermost bead from the respective passageway of the plurality of radially and outwardly extending bead passageways, the metering plate includes an opening of the plurality of equally spaced apart openings configured to align with each of the plurality of pockets in the feed plate, the metering plate being configured such that each of the openings of the plurality of equally spaced apart openings aligns only once with a passageway of the plurality of radially and outwardly extending bead passageways in the feed plate for one revolution of the feed plate, the aperture of the stationary dead plate is configured to receive a single bead from the one opening of the plurality of equally spaced apart openings when the one opening of the plurality of equally spaced apart openings in the metering plate aligns with the aperture in the dead plate as the metering plate rotates relative to the stationary dead plate, the one of the exterior pockets of the bead transfer wheel is configured to receive the single bead from the aperture of the stationary dead plate when the one of the exterior pockets of the bead transfer wheel aligns with the aperture in the stationary dead plate as the bead transfer wheel rotates relative to the stationary dead plate, and the single bead is retained in the aperture of the stationary dead plate from a location of the transfer point for beads away from the metering plate to a location of vertical alignment of one pocket of the spaced apart exterior pockets in the bead transfer wheel with the aperture.

11. A method of serially delivering beads to a downstream location comprising:

rotating a bead supply wheel about a substantially vertical axis, the rotating including rotating a bead supply bowl and a plurality of radially and outwardly extending bead passageways connected to rotate with the bowl;

delivering a single line of beads through a plurality of discharge openings in the bead supply bowl, the plurality of discharge openings spaced around a lower portion thereof, while maintaining the openings in alignment with the radially and outwardly extending bead passageways;

serially positioning the lowermost bead in each passageway into one of a plurality of openings in a rotating metering plate;

rotating the metering plate slower or faster than the rotational speed of the bead passageways, such that vertical alignment of one opening of the plurality of openings with one passageway occurs only once during each revolution of the bead supply wheel;

dropping the beads in the metering plate through a single cylindrical aperture in a stationary dead plate, the cylindrical aperture being a single transfer point for beads away from the metering plate when the metering plate aligns with the cylindrical aperture in the dead plate to transfer a bead of the beads from the one opening directly to the cylindrical aperture, the dead plate being interposed between the metering plate and the bead transfer wheel at the transfer point, and the cylindrical aperture having a radius sufficient to allow beads to pass through the aperture and away from the metering plate when an exterior pocket of the bead transfer wheel aligns with the aperture, but having dimensions not sufficient to accommodate a width of the bead transfer wheel such that the stationary dead plate remains disposed between the metering plate and the bead transfer wheel; and rotating the bead transfer wheel about a substantially horizontal axis constructed such that beads dropping from the metering plate are received by the bead transfer wheel and serially delivered to the downstream location.

12. The method of claim 11, further comprising:

positioning a moving garniture in alignment with and directly below the bead transfer wheel, the garniture transporting filter paper with equally spaced apart plugs on the paper, wherein the downstream locations to which the beads are delivered comprise cavities between the plugs.

13. The method of claim 12, wherein the bead transfer wheel is configured to deliver a single bead to each cavity.

14. The method of claim 11, further comprising:

removing beads from the bead transfer wheel at the downstream location using a stationary stripper positioned adjacent to the bead transfer wheel.

15. The method of claim 11, wherein the aperture has dimensions sufficient to allow beads to pass through the aperture in the absence of applied vacuum.

16. The method of claim 11, wherein the transfer point for beads away from the metering plate is at a location different from a location of vertical alignment of the one opening of the plurality of equally spaced apart openings in the metering plate with the one passageway.

17. The method of claim 16, wherein the location of vertical alignment is before the transfer point.

18. The method of claim 17, wherein the location of vertical alignment is within a range of 10° to 30° before the transfer point.

* * * * *